(12) United States Patent
Hilberer

(10) Patent No.: US 8,142,556 B2
(45) Date of Patent: Mar. 27, 2012

(54) COMPRESSED-AIR SUPPLY DEVICE WITH IMPROVED REGENERATION CAPACITY

(75) Inventor: Eduard Hilberer, Hockenheim (DE)

(73) Assignee: KNORR-BREMSE Systeme fuer Nutzfahzeuge GmbH, Munich (DE)

( * ) Notice: Subject to any disclaimer, the term of this patent is extended or adjusted under 35 U.S.C. 154(b) by 261 days.

(21) Appl. No.: 12/555,228

(22) Filed: Sep. 8, 2009

(65) Prior Publication Data

US 2010/0236653 A1    Sep. 23, 2010

Related U.S. Application Data

(63) Continuation of application No. PCT/EP2008/001855, filed on Mar. 7, 2008.

(30) Foreign Application Priority Data

Mar. 8, 2007 (DE) .......................... 10 2007 011 256

(51) Int. Cl.
*B01D 53/26* (2006.01)
*B60T 17/04* (2006.01)
(52) U.S. Cl. ...................... 96/144; 55/DIG. 17; 137/870
(58) Field of Classification Search .................. 96/113, 96/114, 108, 138, 144, 149; 55/DIG. 17; 137/870
See application file for complete search history.

(56) References Cited

U.S. PATENT DOCUMENTS

| | | | | |
|---|---|---|---|---|
| 4,764,189 A | * | 8/1988 | Yanagawa et al. | 96/114 |
| 4,806,134 A | * | 2/1989 | Lhota | 96/114 |
| 5,103,576 A | * | 4/1992 | Cramer et al. | 34/549 |
| 5,186,522 A | * | 2/1993 | Spencer | 303/1 |
| 5,334,230 A | * | 8/1994 | Sloka | 96/113 |
| 5,458,677 A | * | 10/1995 | VanderMolen | 96/113 |
| 6,089,831 A | | 7/2000 | Bruehmann et al. | |
| 6,120,107 A | * | 9/2000 | Eslinger | 303/1 |
| 6,540,308 B1 | | 4/2003 | Hilberer | |
| 7,771,508 B2 | * | 8/2010 | Hilberer | 95/10 |
| 7,972,418 B2 | * | 7/2011 | Hilberer | 95/117 |

FOREIGN PATENT DOCUMENTS

| | | |
|---|---|---|
| DE | 31 40 455 A1 | 5/1983 |
| DE | 36 36 142 A1 | 4/1988 |
| DE | 195 15 895 A1 | 10/1996 |
| DE | 198 35 638 A1 | 2/2000 |
| WO | WO 94/07726 A1 | 4/1994 |
| WO | WO 02/24505 A1 | 3/2002 |

OTHER PUBLICATIONS

European Office Action dated Feb. 26, 2010 including English translation (Nine (9) pages).
German Office Action dated Apr. 23, 2008 including English translation (Four (4) pages).
German Office Action dated Oct. 15, 2007 including English translation (Eight (8) pages).
International Search Report dated Oct. 7, 2008 including English translation (Four (4) pages).

* cited by examiner

*Primary Examiner* — Frank Lawrence, Jr.
(74) *Attorney, Agent, or Firm* — Crowell & Moring LLP

(57) ABSTRACT

A compressed air supply device for a utility vehicle includes a valve housing and an air-drying cartridge, wherein compressed air can be supplied to the air-drying cartridge via the valve housing. The compressed air flows through the air-drying cartridge in a first direction of flow. An electrically controllable valve is provided in the valve housing, which ensures a return flow of compressed air counter to the first direction of flow through the air-drying cartridge for regeneration purposes. A valve that can be controlled pneumatically by the electrically controlled valve is provided in the valve housing, via which compressed air can be supplied to the air-drying cartridge for regeneration purposes.

16 Claims, 17 Drawing Sheets

COMPRESSED-AIR SUPPLY DEVICE WITH IMPROVED REGENERATION CAPACITY

CROSS-REFERENCE TO RELATED APPLICATIONS

This application is a continuation of PCT International Application No. PCT/EP2008/001855, filed Mar. 7, 2008, which claims priority under 35 U.S.C. §119 to German Patent Application No. DE 10 2007 011 256.6, filed Mar. 8, 2007, the entire disclosures of which are herein expressly incorporated by reference.

BACKGROUND AND SUMMARY OF THE INVENTION

The invention relates to a compressed-air supply device for a utility vehicle, with a valve housing and with an air drier cartridge, the air drier cartridge being capable of being supplied via the valve housing with compressed air which flows through the air drier cartridge in a first flow direction, and there being provided in the valve housing an electrically activatable valve, by means of which a backflow of compressed air through the air drier cartridge opposite to the first flow direction can be induced for the purpose of regenerating the air drier cartridge.

Compressed-air supply devices of this type deliver treated compressed air to compressed-air consumers in utility vehicles. Typical compressed-air consumers are, for example, a pneumatic brake system or pneumatic shock absorption. A compressed-air supply device combines numerous functions. One important task is the drying and purification of the air. For this purpose, an air drier cartridge is provided, which contains the filter devices and a desiccant. Other important tasks are the pressure regulation of the compressed air delivered by a compressor, the reliable distribution of the compressed air to the various consumer circuits and the regeneration of the air drier cartridge by means of a backflow of dry compressed air. These tasks are assumed by valve devices accommodated in a valve housing, to be precise a pressure regulator and a multi-circuit safety valve. Modern compressed-air supply devices contain, in addition to the pneumatic components, an electronic control and also electrically activatable components, for example solenoid valves, and a sensor assembly connected to the electronic control. The compressed-air supply devices thus equipped are also designated as EAC (Electronic Air Control).

The general aim is to make air drying as effective and as efficient as possible, and this, in particular, presupposes a good utilization of the volume available in the air drier cartridge. This also applies to the regeneration capacity of the system, a sufficient quantity of dry air supplied to the air drier cartridge for regeneration purposes having to be made available.

The object on which the invention is based is to make available a compressed-air supply device with improved regeneration capacity.

The invention builds on the generic compressed-air supply device by providing in the valve housing a valve which can be activated pneumatically by the electrically activatable valve and via which the air drier cartridge can be supplied with compressed air for regeneration purposes. In conventional compressed-air supply devices, the air to be supplied to the air drier cartridge for regeneration purposes is conducted through an electrically activatable valve which prevents a backflow of compressed air outside the regeneration phases. A high backflow rate may sometimes be desired during the regeneration phase. In order to make it possible to have such an increased throughput through the regeneration valve, the latter has to be enlarged both in terms of the structural dimensions and with regard to the electrical power. This is undesirable, since existing systems should undergo as few modifications as possible in respect of their valve rating, and, furthermore, since an electronic control unit activating the solenoid valve should not require any additional electrical power. This problem is solved in that the solenoid valve remains unchanged, even when there is an increased demand for compressed air, but the solenoid valve no longer cuts through the compressed air directly to the air drier cartridge, but, instead, serves a control inlet of a pneumatically activatable valve. The latter can readily satisfy increased requirements regarding the throughput of compressed air. The pneumatically activatable valve to that extent functions as a boost valve.

Expediently, there is provision for the electrically activatable valve to be a 3/2-way valve. The "deaeration of the pneumatic control inlet" and the "aeration of the pneumatic control inlet" functions can thereby be fulfilled.

Furthermore, there may be provision for the pneumatically activatable valve to be a 2/2-way valve. The boost valve has sufficient functionality when it can either permit or prevent the backflow of compressed air. A 2/2-way valve is consequently suitable.

Expediently, there is provision for a desiccant box filled with desiccant to be arranged in the housing of the air drier cartridge and for the desiccant to be compressible by means of an elastic device. The elastic device ensures that the desiccant, present as a granulate, is always closely packed, so that the air to be dried optimally experiences a drying action of the granulate. Even the event of operationally induced fluctuations in volume of the desiccant, the elastic device ensures that the close packing is preserved.

According to a particularly preferred embodiment of the present invention, there is provision for the desiccant box to have a base, on which are arranged an outer tubular piece and an inner tubular piece which are open on their side facing away from the base, and for there to be arranged between the outer tubular piece and the inner tubular piece a further tubular piece which is open on its side facing the base and which is displaceable in the axial direction in relation to the desiccant box by means of the elastic device. Thus, four successive walls are present from outside toward the center of the air drier cartridge, to be precise these walls being formed by the housing of the air drier cartridge, the outer tubular piece of the desiccant box, the further tubular piece and the inner tubular piece of the desiccant box.

What is implemented as a result of this is that the housing of the air drier cartridge, the outer tubular piece, the further tubular piece and the inner tubular piece form a labyrinth, through which the compressed air to be dried can flow, along with a threefold reversal of the flow direction. Owing to this labyrinth-like configuration, the air path through the desiccant is prolonged. As a result, the drying action of the air drier cartridge can be improved, or, if the drying action is unchanged, an air drier cartridge having a smaller overall height can be produced. Particularly with regard to a labyrinth-like air drier cartridge, there is a greater demand for regeneration air than in conventional systems. In this regard, therefore, the invention has an especially advantageous outcome.

There may be provision for the desiccant box to cooperate sealingly with the valve housing via a radial seal. This is useful especially in what are known as open systems, in which the air drier cartridge seals off directly on the valve housing.

In closed systems in which a foot flange seals off with respect to the valve housing, there is provision for the desiccant box to cooperate sealingly with a foot flange of the air drier cartridge via a radial seal.

Other objects, advantages and novel features of the present invention will become apparent from the following detailed description of one or more preferred embodiments when considered in conjunction with the accompanying drawings.

DETAILED DESCRIPTION OF THE DRAWINGS

In the following description of the drawings, the same reference symbols designate identical or comparable components.

Figure 1:
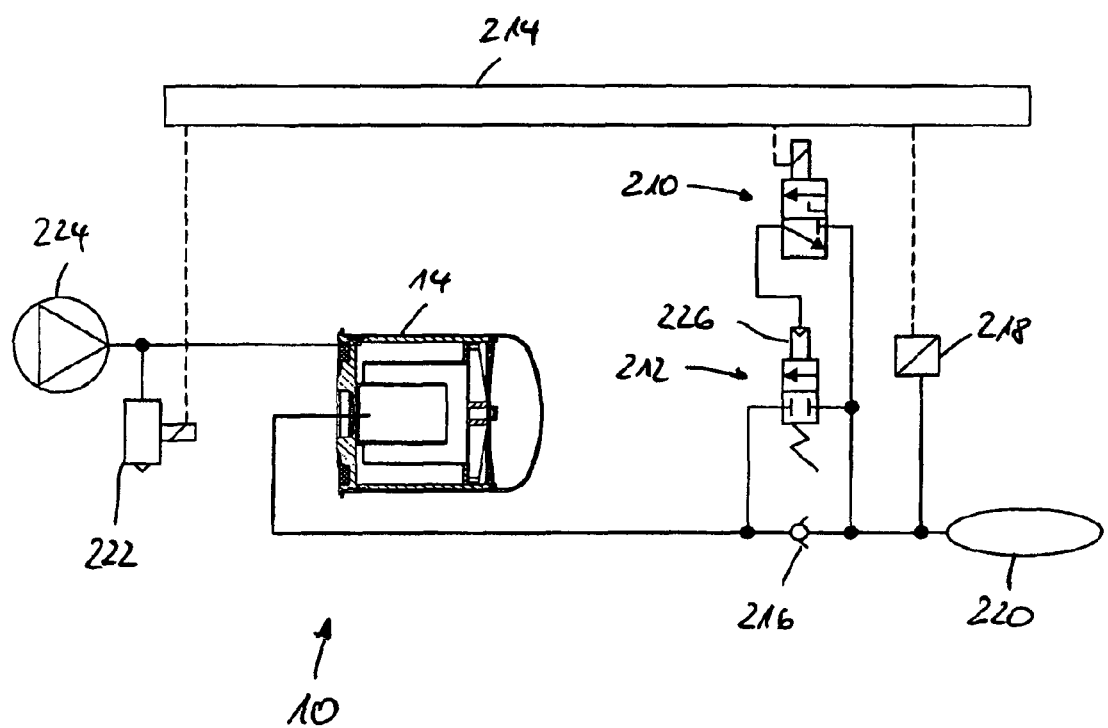
FIG. 1 shows a diagrammatic illustration of a compressed-air supply device according to the invention.

FIG. 1 shows a diagrammatic illustration of a compressed-air supply device according to an embodiment of the invention. The compressed-air supply device 10 comprises an air drier cartridge 14 which can be placed onto a valve housing (see FIG. 4 ff). This valve housing has a multiplicity of valves which can be activated pneumatically or electrically. The valves which are particularly essential for the present invention as shown in FIG. 1, to be precise an electrically activatable 3/2-way valve 210 and a pneumatically activatable 2/2-way valve 212. The electrically activatable valve 210 is activated by an electronic control unit 214 which can cause a multiplicity of control and regulating functions of the compressed-air supply device. Furthermore, a nonreturn valve 216, which can be bridged by the pneumatically activatable 2/2-way valve 212, and a pressure sensor 218 connected to the electronic control unit 214 are provided, the pressure sensor 218 detecting the pressure in a compressed-air tank 220 following the compressed-air supply device. Moreover, an electrically activatable discharge valve 222 is provided. The compressed-air supply device 10 is preceded by a compressor 224.

While the compressor 224 is operating in conveyance, the discharge valve 222 is normally closed. Compressed air is therefore conveyed via the valve housing into the air drier cartridge 14 and is purified and dried there, in order then to be supplied from the air drier cartridge 14, via the nonreturn valve 216, to the compressed-air consumers, of which the compressed-air tank 220 is illustrated as an example. The supply of compressed air to the various consumer circuits in this case expediently takes place via a multi-circuit safety valve. During the regeneration of the compressed-air supply device, the compressor 224 is deactivated by means of the separation of a coupling or by a transfer into an idling position, and the discharge valve 222 is opened in that it is activated electrically by the control unit 214. The discharge valve may also be of purely pneumatic design. The 3/2-way valve is likewise changed over by the electric control unit 214, so that the control inlet 226 of the 2/2-way valve 212 is acted upon with pressure. The control pressure is branched off from the consumer side with respect to the nonreturn valve 216. The result of the changeover of the 2/2-way valve 212 is that dried compressed air from the tanks 220 flows via the 2/2-way valve 212, at the same time bypassing the nonreturn valve 216, through the air drier cartridge 14. The compressed air flowing back then leaves the system through the discharge valve 222.

Figure 4:
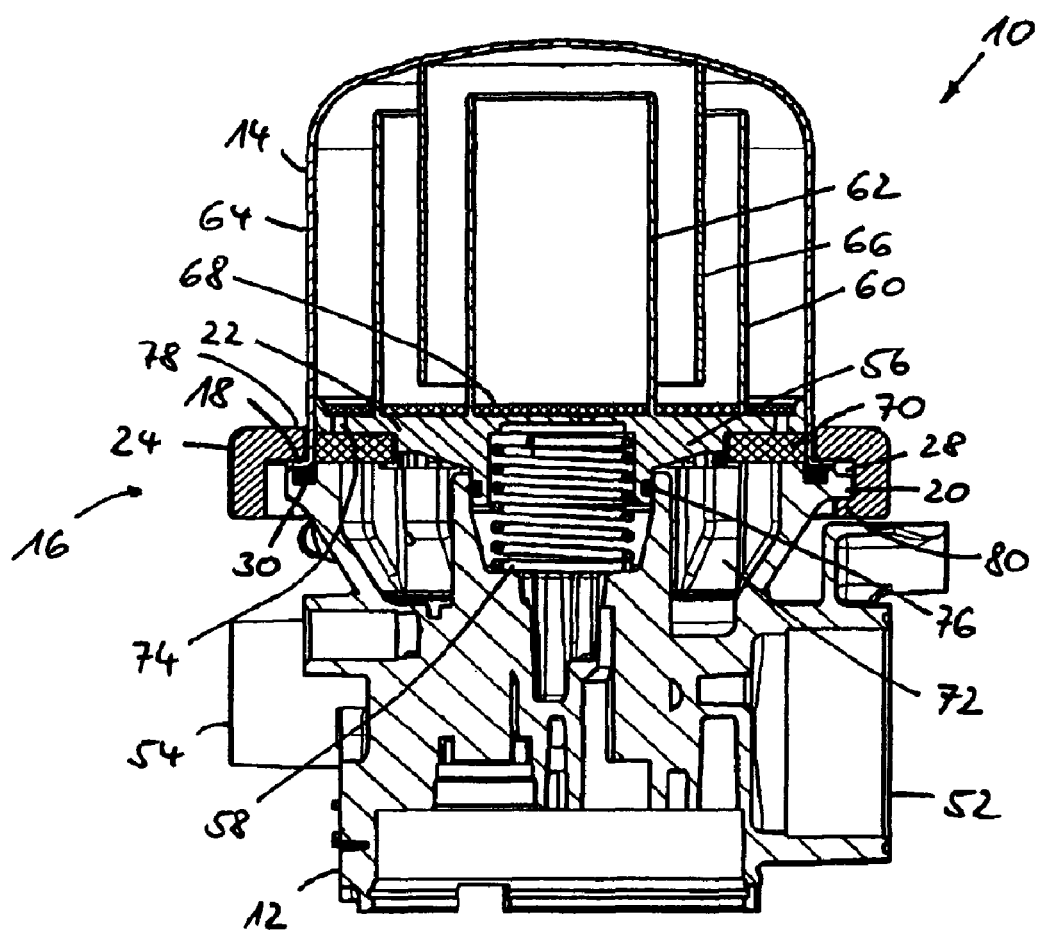
FIG. 4 shows a first embodiment of a compressed-air supply device in a sectional illustration.

Whereas, in conventional systems, the compressed air of the 3/2-way valve 210 now used as control compressed air is employed directly as regeneration air, the compressed air controlled by a pneumatic valve is now used, with the result that a higher demand for compressed air can be satisfied, particularly in respect of the labyrinth-like embodiments of the air drier cartridge which are described below (FIG. 4 ff.).

Figure 2:
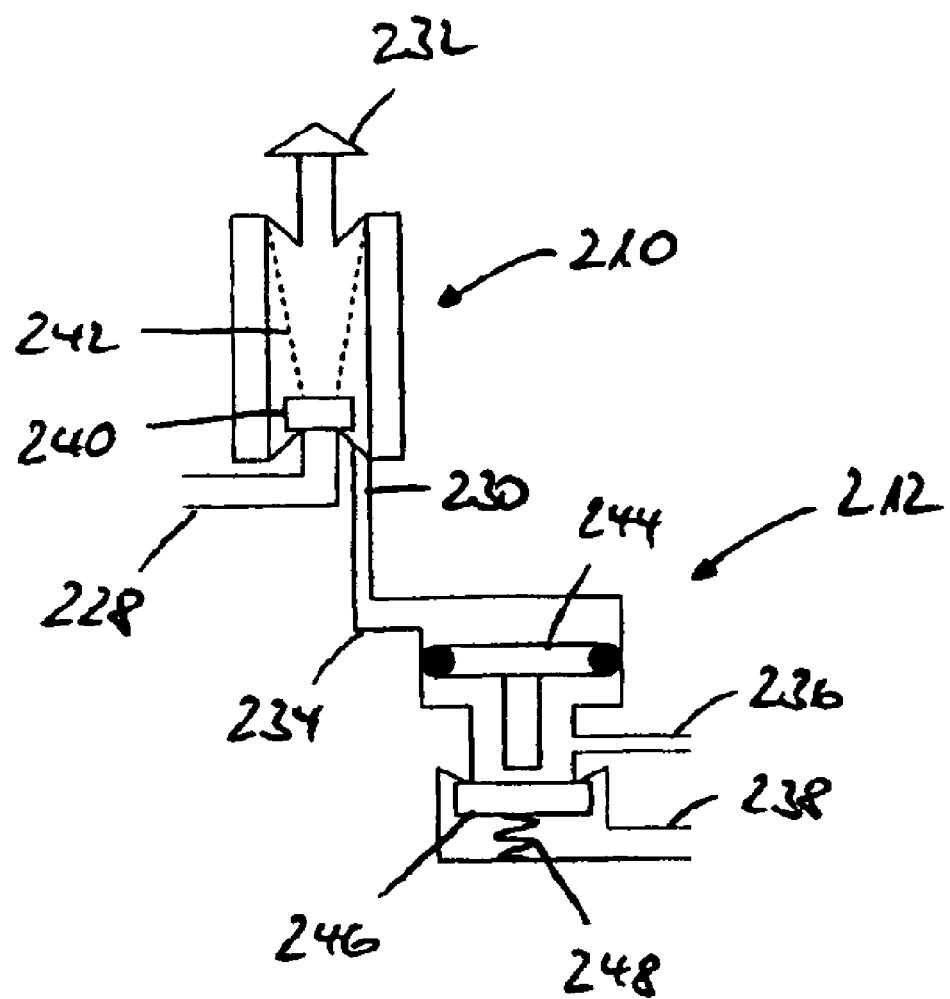
FIG. 2 shows a diagrammatic illustration of a first embodiment of a regeneration valve device.

FIG. 2 shows a diagrammatic illustration of a first embodiment of a regeneration valve device. The 3/2-way valve 210 is configured as a seat valve with a first connection 228, a second connection 230 and a deaeration 232. The 2/2-way valve 212 is likewise implemented as a seat valve, a control inlet 234, which is connected to the connection 230 of the 3/2-way valve 210, and two further connections 236, 238 being provided. The state illustrated in FIG. 2 is present during the conveying phase of the compressor. The 3/2-way valve 210 is currentless, and a valve disk 240 is pressed by a spring 242 onto a valve seat assigned to the compressed-air connection 228. The control inlet 224 of the 2/2-way valve 212 is consequently deaerated, and the connections 236, 238 of the 2/2-way valve 212 are not connected to one another. When the 3/2-way valve 210 is changed over, the valve disk 240, counter to the force of the spring 242, closes the valve seat facing the deaeration 232. Compressed air consequently passes via the connection 228, which faces the compressed-air tanks 220 (see FIG. 1), and via the connection 230 to the control inlet 234 of the 2/2-way valve 212. The control piston 244 of the 2/2-way valve is thereby displaced, so that it lifts off the valve disk 246 from its seat counter to the force of the spring 248. This results in connecting the connections 236, 238 of the 2/2-way valve. If, for example, the connection 236 is connected to the compressed-air tanks 220 and the connection 238 to the air drier cartridge 14, a backflow of compressed air from the connection 236 via the connection 238 to the air drier cartridge takes place.

Figure 3:
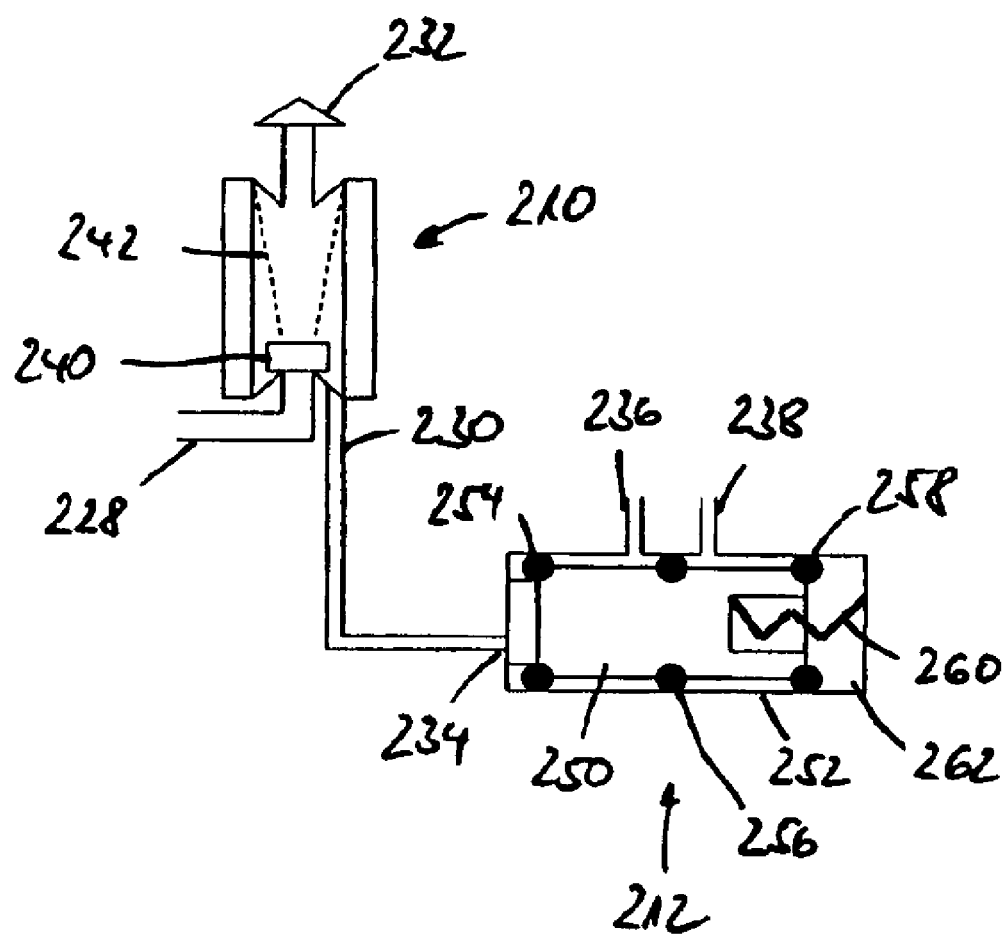
FIG. 3 shows a diagrammatic illustration of a second embodiment of a regeneration valve device.

FIG. 3 shows a diagrammatic illustration of a second embodiment of a regeneration valve device. In terms of the 3/2-way valve 210, the embodiment according to FIG. 3 is identical to the embodiment according to FIG. 2. In the present case, however, the 2/2-way valve 212 is designed as a piston valve. A piston 250 is guided in a valve housing 252, three seals 254, 256 and 258 being provided. In the state illustrated, in which the control space 234 of the 2/2-way valve 212 is deaerated, the spring 260 ensures that the piston 250 is in a position in which the seal 256 separates the connections 236, 238 from one another. The seal 254 separates the control inlet 234 from the connection 236. The seal 258 separates the backspace 262 of the piston 250, in which the spring 260 is located, from the connection 238. In order to make a displacement of the piston 250 possible, the backspace 262 is connected to the atmosphere. If, then, the control inlet 234 of the 2/2-way valve 212 is acted upon with pressure by the 3/2-way valve 210 being changed over, the piston 250 is displaced counter to the force of the spring 260 to an extent such that the seal 256 no longer separates the connections 236, 238. These are consequently connected, and they can therefore allow a backflow of compressed air through the air drier cartridge.

Figure 5:
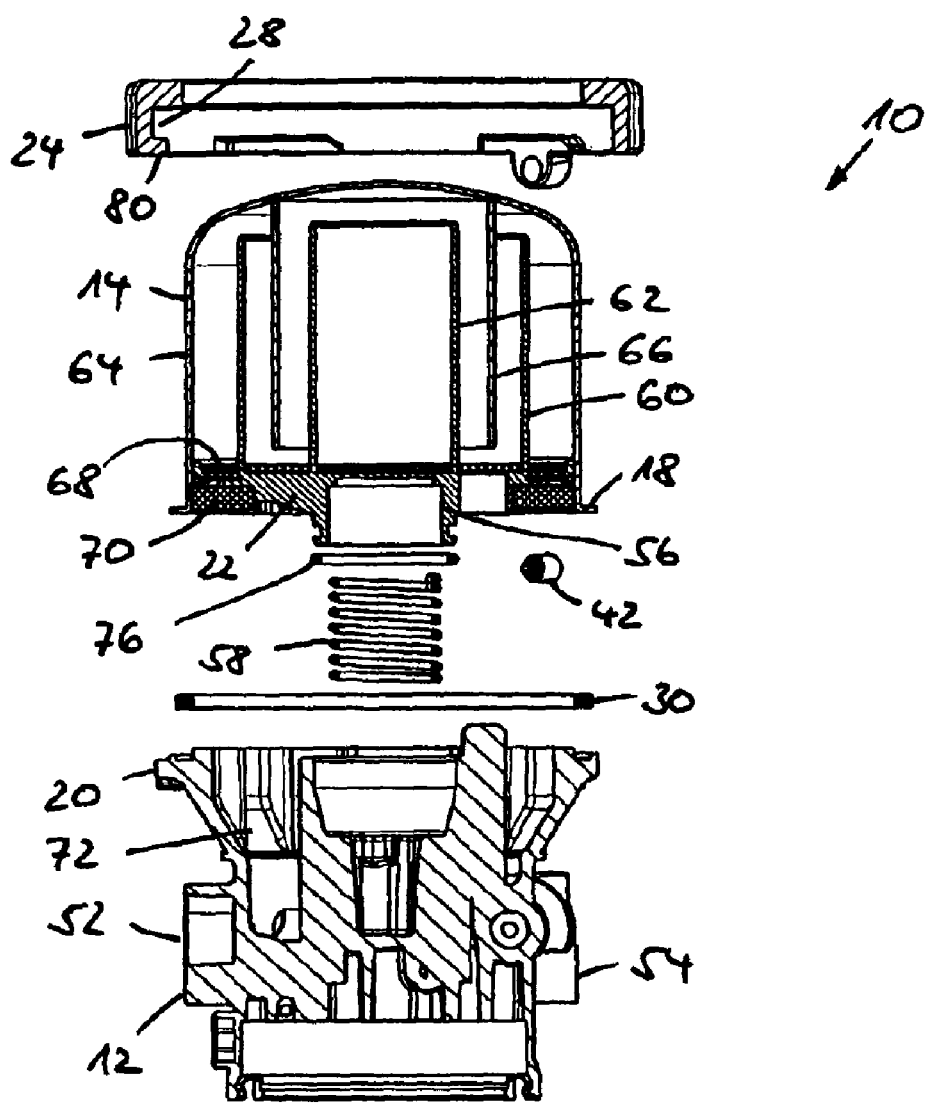
FIG. 5 shows a first embodiment of a compressed-air supply device in a sectional exploded illustration.

FIG. 4 shows a first embodiment of a compressed-air supply device in a sectional illustration. FIG. 5 shows a first embodiment of a compressed-air supply device in a sectional exploded illustration.

The compressed-air supply device 10 has a valve housing 12 and an air drier cartridge 14. The valve housing 12 has an inlet 52, to which a compressor can be connected and via which compressed air to be treated can flow in. Moreover, an outlet 54 for conducting the treated compressed air further on is provided. In the air drier cartridge 14, a desiccant box 56 is arranged which preferably consists of plastic and which projects into the valve housing 12 and is supported on the latter via a spring 58. The desiccant box 56 comprises a base 22, an outer tubular piece 60 and an inner tubular piece 62 which extend into the air drier cartridge 14. Between the tubular pieces 60, 62, a further tubular piece 66, preferably consisting of metal, is arranged, which is fastened to the housing 64 of the air drier cartridge 14 and is open in the direction of the valve housing 12, while the tubular pieces 60, 62 of the desiccant box 56 are open in the opposite direction. The tubular piece 66 may expediently be connected to the housing 64 by means of spot welding, additional sealing being provided, for example by means of curing material. By means of the tubular pieces 60, 62, 66 arranged one in the other and by means of the housing 64, a labyrinth is formed which is filled completely with granulate for drying the compressed air flowing through the labyrinth. The close packing of the desiccant in the air drier cartridge 14 is applied by means of the force which is afforded by the spring 58 and which drives the desiccant box 56 into the air drier cartridge 14. The space filled by desiccant is at least partially delimited in the direction of the valve housing 12 by filter fleece 68, in which case the individual regions of the filter fleece 68 which are delimited by the tubular pieces 60, 62, 66 may consist of identical or different materials. In particular, the outer region of the filter fleece 68 between the tubular piece 60 and the housing 64 of the air drier cartridge 14 and the central region of the filter fleece 68 inside the inner tubular piece 62 are designed as dust filters, while the fleece region arranged between the outer tubular piece 60 and the inner tubular piece 62 is designed for the uptake and, as required, emission of foreign substances which can emerge from the desiccant box 56 via nonreturn valves (see FIG. 20). Furthermore, in the region of the lower boundary of the air drier cartridge 14, a prefilter 70 is arranged which may optionally have the properties of a coalescence filter. The prefilter 70 serves particularly for purifying the compressed air in respect of compressor oil and of comparable contaminations.

Compressed air flowing into the valve housing 12 via the inlet 52 is distributed via ducts in the valve housing 12, in order then to flow via the duct 72 to the prefilter 70 and pass through the latter. Thereafter, the compressed air flows through the duct 74 and subsequently through the filter fleece 68 into the closely packed desiccant. The air flows out in the air drier cartridge beyond the open end of the outer tubular piece 60 of the desiccant box 56 and is then deflected in order to flow between the outer tubular piece 60 and the tubular piece 66, fastened to the housing 64 of the air drier, in the direction of the valve housing 12 again. After the compressed air has passed the open end of the tubular piece 60, it is deflected once more, in order subsequently to flow out between the tubular piece 66, fastened to the housing 64 of the air drier cartridge 14, and the inner tubular piece 62 and also via the end of this tubular piece 62. The air is deflected once more there, in order then to flow centrally through the inner tubular piece 62 and the filter fleece 68 out of the air drier cartridge 14 and the desiccant box 56 into the valve housing 12 again. The air is collected in the valve housing 12 via ducts and can then be extracted via the outlet 54.

In order to make the air routing thus outlined possible, a sealing of the desiccant box 56 with respect to the valve housing 12 is necessary by means of a seal 76 which is designed here as a radially acting seal, in particular as an O-ring. Furthermore, an axially acting seal 30 is provided, which seals off a collar 18 of the housing 64 of the air drier cartridge 14 with respect to the valve housing 12. In order to make available the compression, required for sealing, of the seal 30, a bayonet fastening 16 is provided which holds the valve housing 12 and the air drier cartridge 14 together. The bayonet fastening 16 comprises an outer bayonet ring 26 with inner partially formed recesses 28 which are formed by projections 80 and a circumferentially continuous collar 78. These inner recesses 28 are suitable for receiving collar portions 20 of the valve housing 12 and for applying an axial force by means of these, in each case via beveled surfaces, by the outer bayonet ring 24 being rotated with respect to the valve housing 12, this axial force pressing the collar 18 of the air drier cartridge 14 against the valve housing 12 via the seal 30. The circumferentially continuous collar 78 of the outer bayonet ring 24 thus cooperates with the circumferentially continuous collar 18 of the air drier cartridge 14, while the collar portions 20 of the valve housing cooperate with the projections 80 of the outer bayonet ring 24 via their inclined surfaces and thus, during relative rotation, make the characteristic of a bayonet fastening available. Furthermore, in the exploded illustration according to FIG. 5, a securing element can be seen which is explained in more detail with reference to the following figure.

Figure 6:
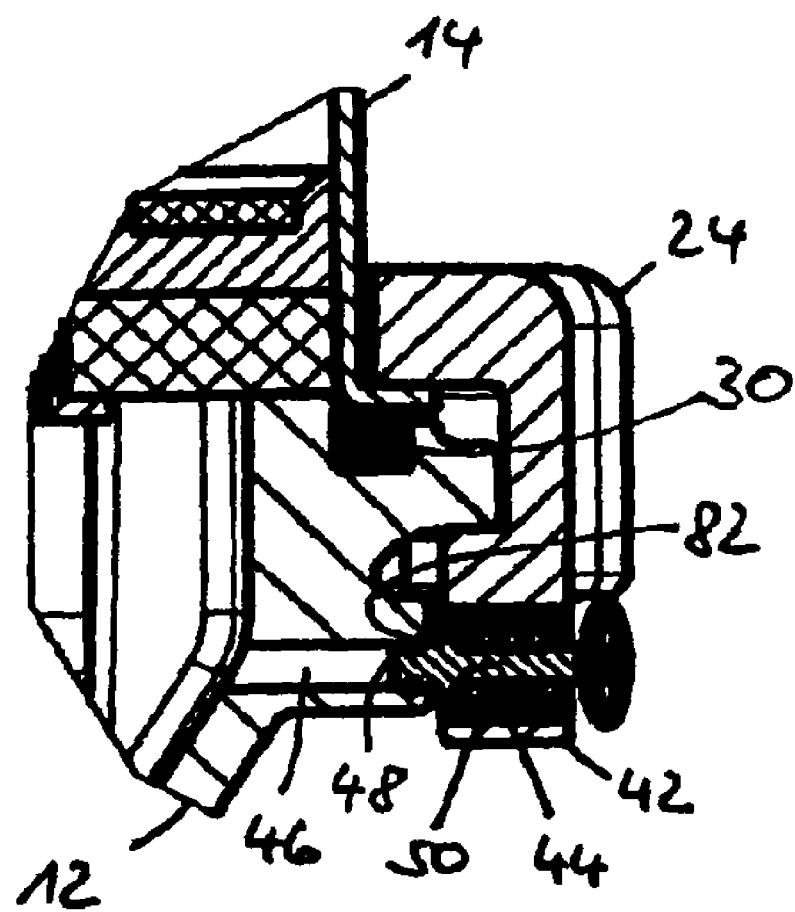
FIG. 6 shows a sectional view of part of a compressed-air supply device with a securing element.

FIG. 6 shows a sectional view of part of a compressed-air supply device with a securing element. The securing element 42 is seated in an orifice 44 of the outer bayonet ring 24 and is fixedly connected to the latter there. In the state illustrated in FIG. 6, a nose 48 of the securing element 42 penetrates into an orifice 46 of the valve housing, said orifice being connected to the compressed-air routes in the valve housing 12. The nose 48 of the securing element 42 carries a seal 82, so that, in the state illustrated, compressed air is prevented from flowing out. If the outer bayonet ring 24 is rotated with respect to the valve housing 12 in order to open the bayonet fastening 16, it is necessary in the first place to pull the securing element 42 outward out of the orifice 46 counter to the force of a spring 50. After opening of the orifice 46, the compressed air can then flow out of the system; at the same time, the rotational movement of the outer bayonet ring 24 with respect to the valve housing 12 is enabled. When the bayonet fastening 16 is being closed, the outer bayonet ring 24 is rotated with respect to the valve housing 12 in the closing direction until the nose 48 latches again into the orifice 46 and seals off the latter. If latching is audible, the driver at the same time has confirmation of the correct mounting of the compressed-air supply device 10. Since an orifice 46 for the outflow of compressed air will be present only in one circumferential position of the valve housing 12, it must be ensured that the outer bayonet ring 24 can be guided in only exactly one position over the collars to be connected to one another, for example by means of mechanical guides, so that, during closing, the securing element 42 and the orifice 46 then also meet one another.

Figure 7:
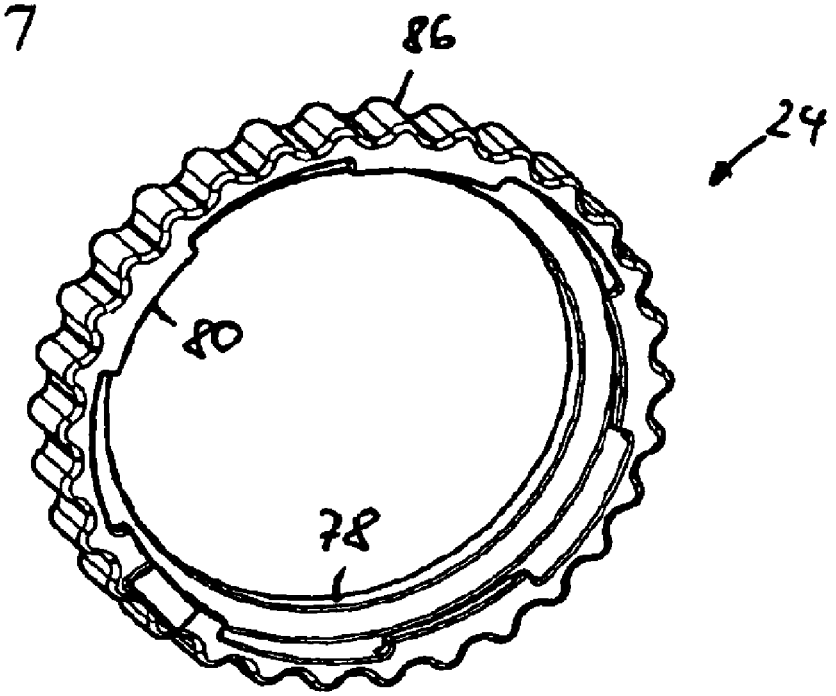
FIG. 7 shows a perspective illustration of an outer bayonet ring.
Figure 8:
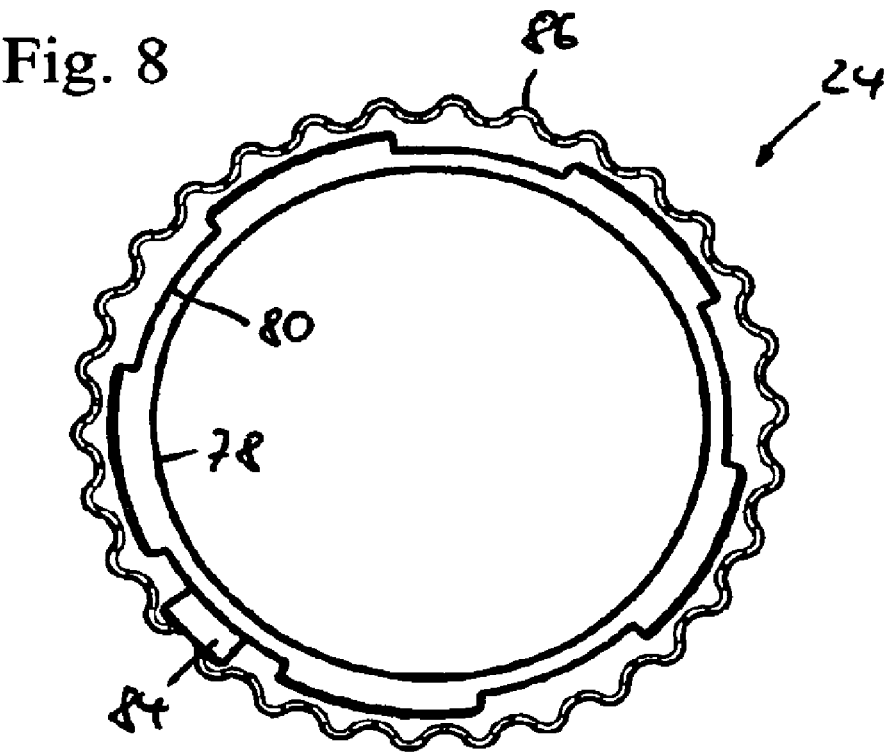
FIG. 8 shows a top view of an outer bayonet ring.

FIG. 7 shows a perspective illustration of an outer bayonet ring. FIG. 8 shows a top view of an outer bayonet ring. The outer bayonet ring has a corrugated surface 86 on its outside, thus improving the handling during closing and opening. On the inside of the outer bayonet ring 24 can be seen the projecting collar 78, which comes to lie on the collar 18 of the air drier cartridge 14, and the projections 80 which cooperate with the portions 20 of the valve housing. Furthermore, the securing element holder 84 can be seen. It can be seen in FIG. 7 that the projections 80 increase in thickness from one end region to the other, while, in addition, a sharper run-on slope is also provided at the thinner end region. The run-on slope may, for example, have an inclination of 30°, while the following surface has a gradient of, for example, 1.5°.

Figure 9:
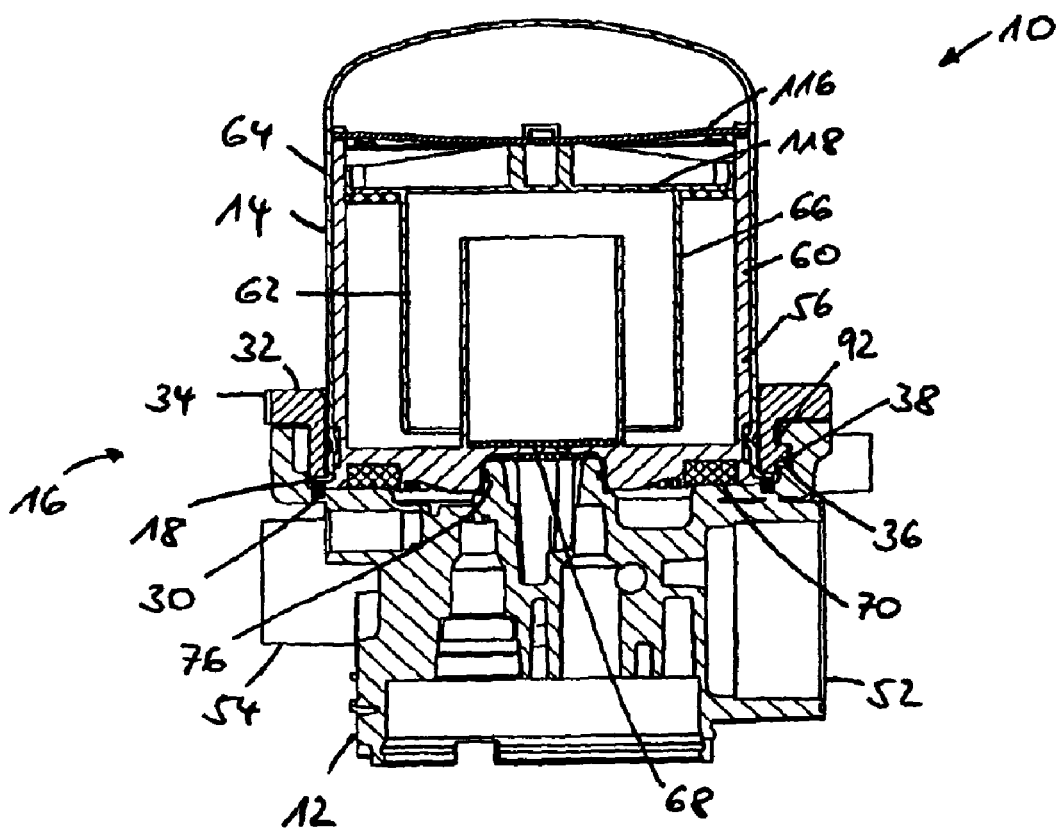
FIG. 9 shows a second embodiment of a compressed-air supply device in a sectional illustration.

FIG. 9 shows a second embodiment of a compressed-air supply device in a sectional illustration. Contrary to the embodiment described hitherto, the bayonet fastening 16 connecting the air drier cartridge 14 to the valve housing 12 has an inner bayonet ring 32. The inner bayonet ring 32 is guided over the air drier cartridge 14 and, via latching noses 90 on the inner surface of the inner bayonet ring 32 and corresponding recesses 88 on the housing 64 of the air drier cartridge, is secured against rotation with respect to the latter. The inner bayonet ring 32 has an outwardly extending collar 34 and outwardly extending projections 36 offset axially with respect to this. The projections 36 have slopes which engage into recesses 38 of a part of the valve housing 12 which lies partially outside the inner bayonet ring 32, in order to cooperate with the projections 92 delimiting the recesses 38 on one side and extending radially inward. For this purpose, the projections 92 likewise have slopes which make available a nonpositive connection between the projections 92 of the valve housing 12 and the projections 36 of the inner bayonet ring 32 as a result of a relative rotation of the inner bayonet ring 32 and valve housing 12. The closing of the bayonet fastening 16 gives rise to an axially acting force which acts on a seal 30 via the collar 18 of the air drier cartridge 14; this seal, on the other hand, cooperates with the valve housing 12. A further seal 76 is designed as a radial seal, that is to say, in particular, as an O-ring. It seals off the valve housing 12 with respect to the desiccant box 56 which preferably consists of plastic.

By means of the system set up and sealed in this way, in turn, efficient and effective air drying is possible, in that compressed air flows in via the inlet 52 of the valve housing 12, is distributed via air ducts in the valve housing 12 and flows via a prefilter 70, preferably designed as a coalescence filter, into the air drier cartridge 14 or the desiccant box 56 arranged in the latter. The desiccant box 56, in turn, comprises an outer upwardly open tubular piece 60 and an inner upwardly open tubular piece 62. Between the outer tubular piece 60 and the inner tubular piece 62, a further tubular piece 66 is arranged which is open downward and preferably consists of metal. This metallic tubular piece 66 is held by a compression device 118 which is acted upon with force by a spring device 116. By means of this spring force, the granulate provided in the desiccant box and acting as a desiccant is closely packed. The air flowing out of the prefilter 70 flows outside the outer tubular piece 60, that is to say between the outer tubular piece 60 and the housing 64 of the air drier cartridge 14, upward through axial ducts, not illustrated, which are arranged between the bearing regions of the desiccant box 56 which can be seen. To make these air routes clearer, reference is made to FIG. 18. The air flows around the open end of the outer tubular piece 60, enters into the desiccant-free space above the compression device 118 and subsequently flows downward between the downwardly open tubular piece 66 and the outer tubular piece 60, in order then, once again, to reverse its flow direction and flow upward between the inner tubular piece 62 and the downwardly open tubular piece 66. After a further flow reversal, the air to be dried then flows into the inner tubular piece 62, in order then to leave the latter downward through a filter fleece 68, acting as a dust filter, into the valve housing 12. Dried air is then discharged via the outlet 54.

The desiccant box 56 and the free region between the desiccant box 56 and housing 64 are filled completely with granulate. This may be of uniform type. It may also be especially useful to introduce different types of desiccant into the desiccant box 56. Thus, the desiccant undergoing an initial throughflow may be optimized for relatively moist air, whereas the desiccant in the outflow region is optimized for the residual demoisturizing of already predried air.

Figure 10:
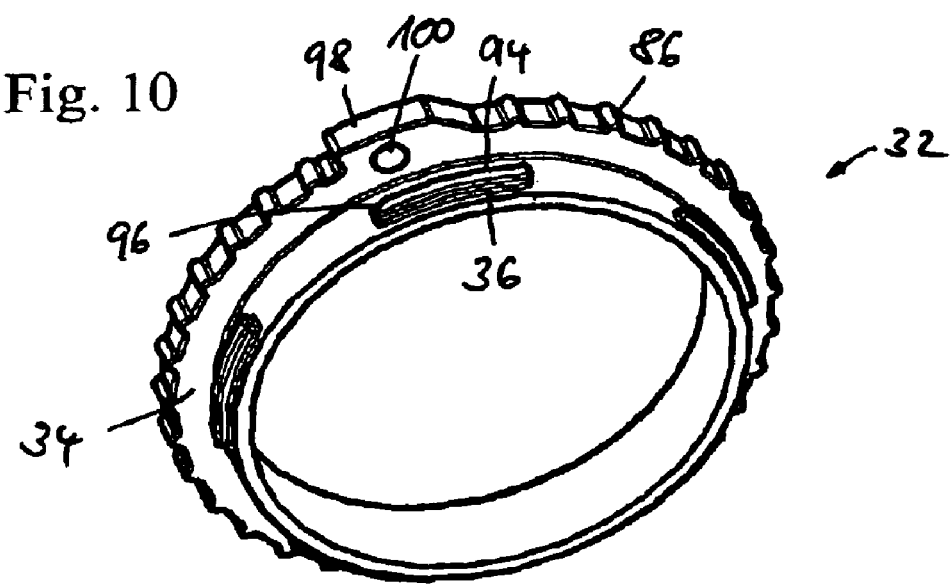
FIG. 10 shows a perspective illustration of an inner bayonet ring.
Figure 11:
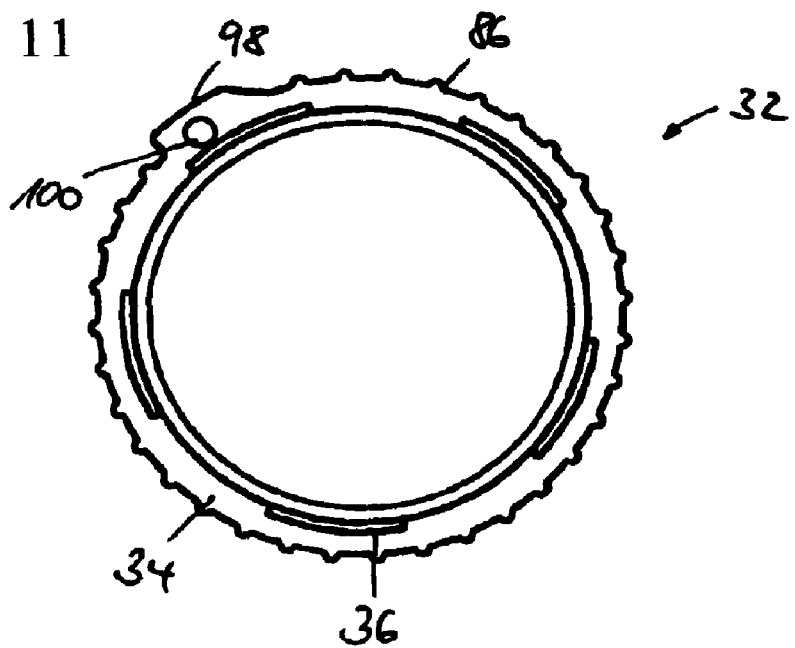
FIG. 11 shows a top view of an inner bayonet ring.

FIG. 10 shows a perspective illustration of an inner bayonet ring. FIG. 11 shows a top view of an inner bayonet ring. The inner bayonet ring 32 has a corrugated outer surface 86, thus improving the handling when the inner bayonet ring 32 is being rotated. The corrugated outer surface is arranged on the outwardly directed collar 34 of the inner bayonet ring 32. Projections 36 are provided, offset axially with respect to the collar 34, which are likewise directed outward and which have the inclination, necessary for the bayonet function, of the surface 94 facing the collar 34. This inclination may amount, for example, to 1.5°. To make the initial rotational movement when the bayonet fastening is being closed easier, run-on slopes 96 are provided which have a markedly greater inclination, for example 30°. The projections 36 may advantageously have a stop in order to limit the closing movement of the bayonet fastening. On an extension 98 on the collar 34, an axial bore 100 can be seen, which serves for receiving the securing element 42 described in detail in connection with FIG. 6. In use, the securing element 42 is seated fixedly in this bore 100, so as then to latch with its nose into a bore in the valve housing 12, said bore allowing compressed air to flow out from the compressed-air supply device 10. Thus, in conjunction with the inner bayonet solution, too, the advantageous combination of a compressed-air discharge device and a latching device is made available.

The embodiments of the present invention which were described in connection with FIGS. 4 to 11 contain air drier cartridges which are designed as open systems. This means that the air drier cartridge seals off directly on the valve housing via a seal, that is to say, in particular, without an interposed flange.

Figure 12:
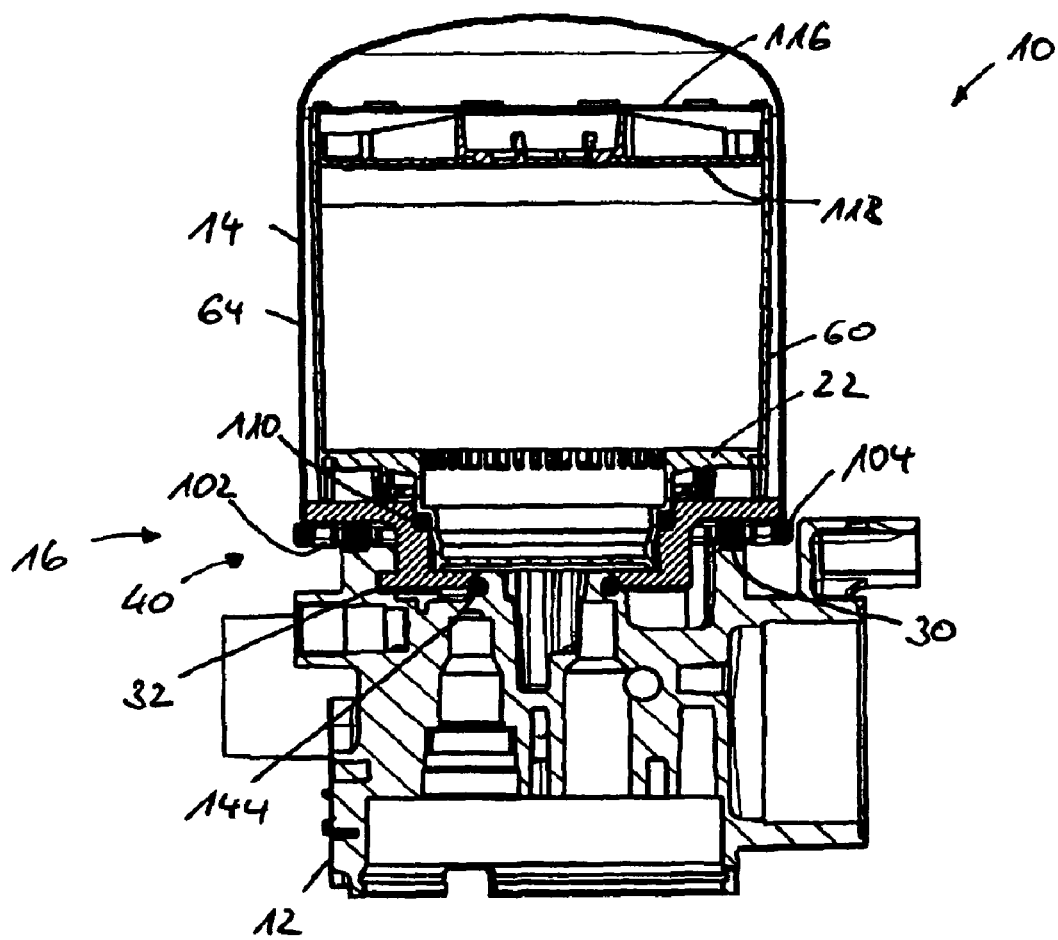
FIG. 12 shows a third embodiment of a compressed-air supply device in a sectional illustration.
Figure 13:
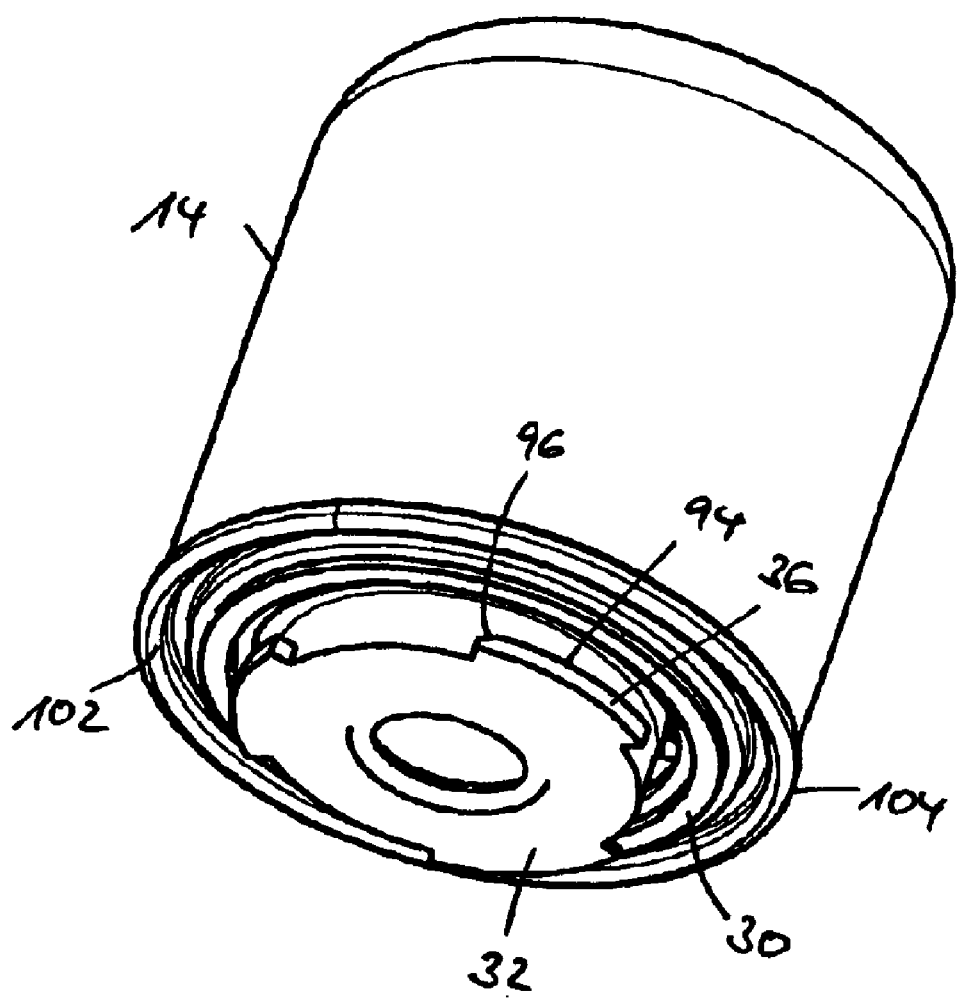
FIG. 13 shows a perspective illustration of an air drier cartridge with a foot flange and inner bayonet ring.
Figure 14:
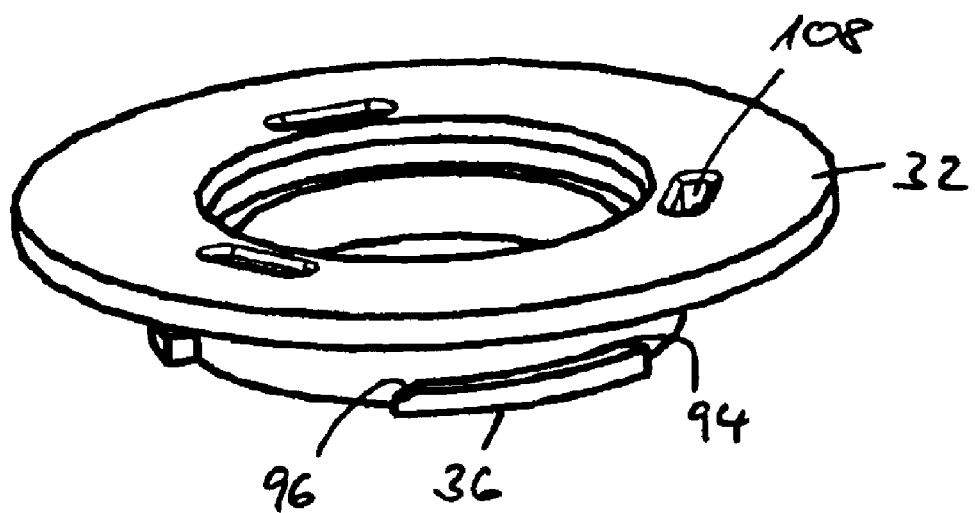
FIG. 14 shows a perspective illustration of an inner bayonet ring with a foot flange function.
Figure 15:
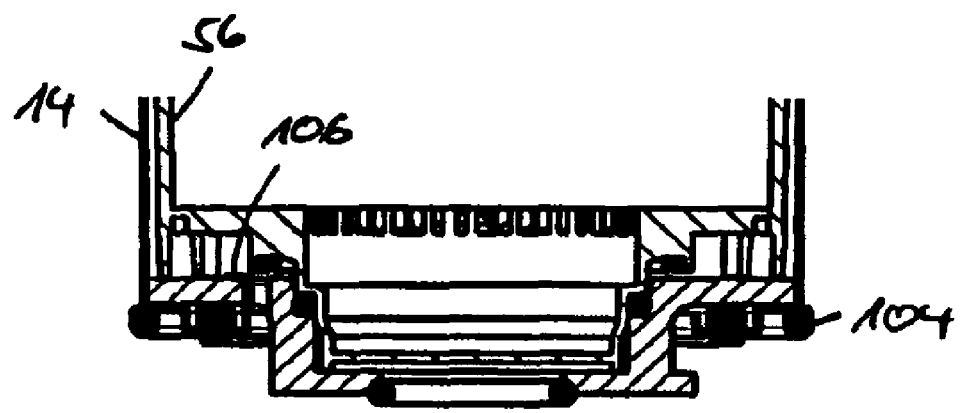
FIG. 15 shows a sectional view of part of a compressed-air supply device in order to explain a first type of mounting of a foot flange.
Figure 16:
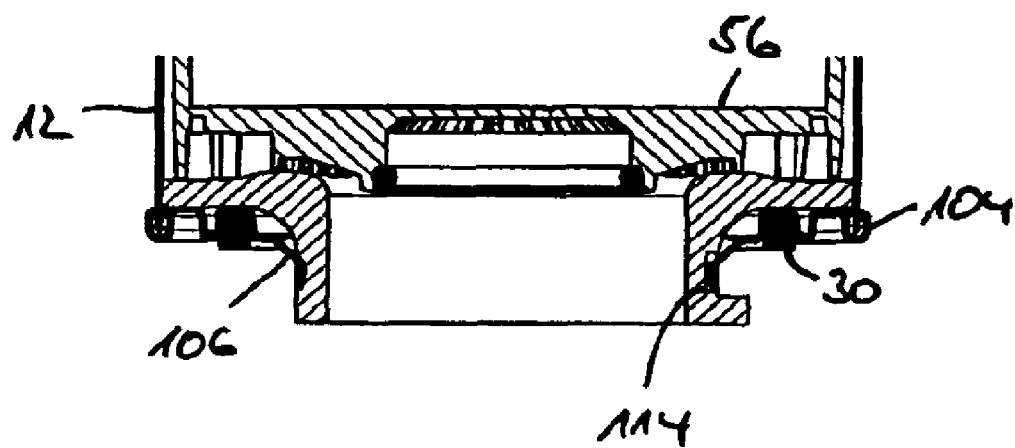
FIG. 16 shows a sectional view of part of a compressed-air supply device in order to explain a second type of mounting of a foot flange.

FIG. 12 shows a third embodiment of a compressed-air supply device in a sectional illustration. FIG. 13 shows a perspective illustration of an air drier cartridge with a foot flange and inner bayonet ring. FIG. 14 shows a perspective illustration of an inner bayonet ring with a foot flange function. FIG. 15 shows a sectional view of part of a compressed-air supply device in order to explain a first type of mounting of a foot flange, and FIG. 16 shows a sectional view of part of a compressed-air supply device in order to explain a second type of mounting of a foot flange. The system illustrated in these figures contains a closed air drier cartridge 14. Closed air drier cartridges 14 are spoken of when their housing 64 does not seal off directly on the valve housing 12, but, instead, a foot flange 40 is provided. The foot flange 40 is combined with an inner bayonet ring 32 which, in terms of its configuration making the bayonet action available, is comparable to the inner bayonet ring described in connection with FIGS. 9 to 11. The valve housing 12 likewise has in respect of the bayonet fastening 16 a comparable configuration to that of the valve housing 12 described in connection with FIG. 9. The inner bayonet ring 32 is connected to the housing 64 of the air drier cartridge 14 via a cover 102. The cover 102 is connected to the housing 64 of the air drier cartridge via a knurled margin 104. The foot flange 40 cooperates with the valve housing 12 via a seal 30 which bears against the cover 102, the sealing-off force acting in the axial direction. A further radially acting seal 144 is provided between the valve housing 12 and the inner bayonet ring 32. A radial seal 110 is likewise arranged between the desiccant box 56 and the inner bayonet ring 32. The system thus set up and sealed off allows compressed air to flow into the inlet 52, a transfer of the compressed air into the region between the desiccant box 56 and the housing 64 of the air drier cartridge 14, a deflection of the air into the central desiccant-filled region 112 of the desiccant box 56 and a subsequent outflow of the dried air from the air drier cartridge 14 into the valve housing 12, out of which the dried air can then be extracted via the outlet 54. The desiccant present in the desiccant box 56 is compressed via a spring device acting upon a compression device 118.

According to FIGS. 14 and 15, the connection of the cover 102 to the inner bayonet ring 32 occurs as a result of the engagement of tabs 106 into orifices 108 provided for this purpose in the inner bayonet ring 32.

In terms of the fastening of the cover 102 to the inner bayonet ring 32, FIG. 16 shows a variant. Here, tabs 106 do not engage into orifices 108 of the inner bayonet ring 32. Instead, these lie in grooves 114 of the inner bayonet ring 32. These grooves 114 are arranged on the circumference of the inner bayonet ring such that they do not interfere with the projections required for the bayonet function.

The desiccant box 56 according to FIG. 12 has a basically different set-up from the desiccant boxes 56 described in connection with FIGS. 4, 5 and 9. Whereas the latter form a four-pitch labyrinth, the desiccant box 56 according to FIG. 12 has no such labyrinth-like set-up. It should be noted that the closed system according to FIG. 12 can readily likewise be combined with a desiccant box 56 having a labyrinth-like set-up, as is shown in FIGS. 4, 5 and 9. The same applies conversely, since the use of labyrinth-like desiccant boxes is not mandatory for the open systems according to FIGS. 4, 5 and 9.

Figure 17:
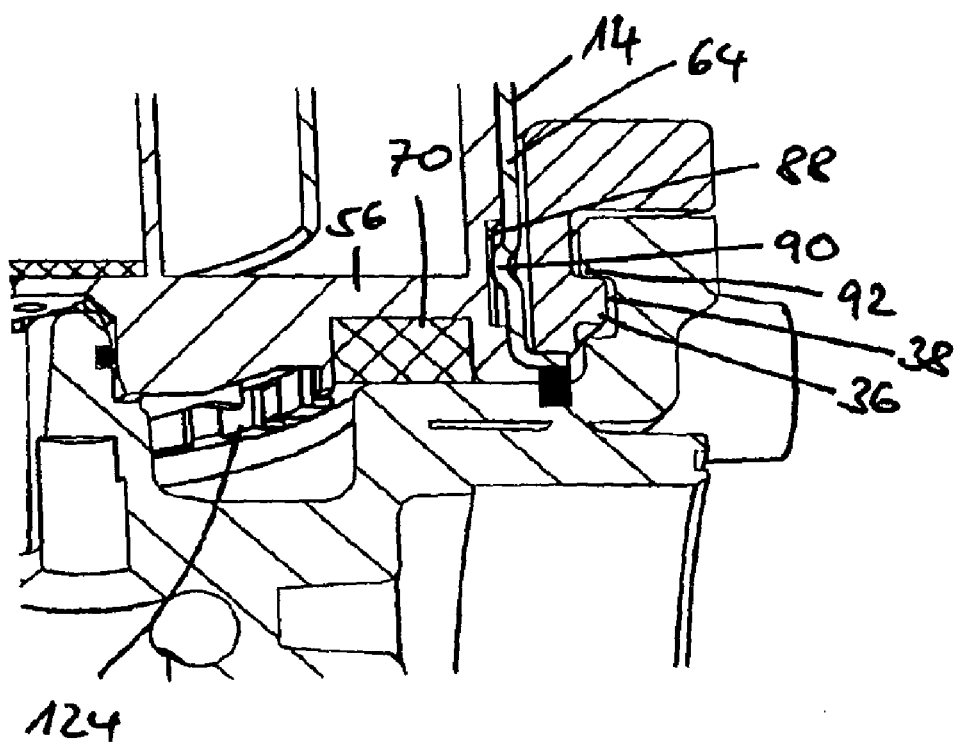
FIG. 17 shows part of a compressed-air supply device in a sectional illustration.

FIG. 17 shows part of a compressed-air supply device in a sectional illustration. In this illustration, the connection between the housing 64 of the air drier cartridge 14 and the desiccant box 56 can be seen clearly. A latching nose 90 is arranged in a recess 88. Furthermore, holders 124 for holding the prefilter 70 are shown.

Figure 18:
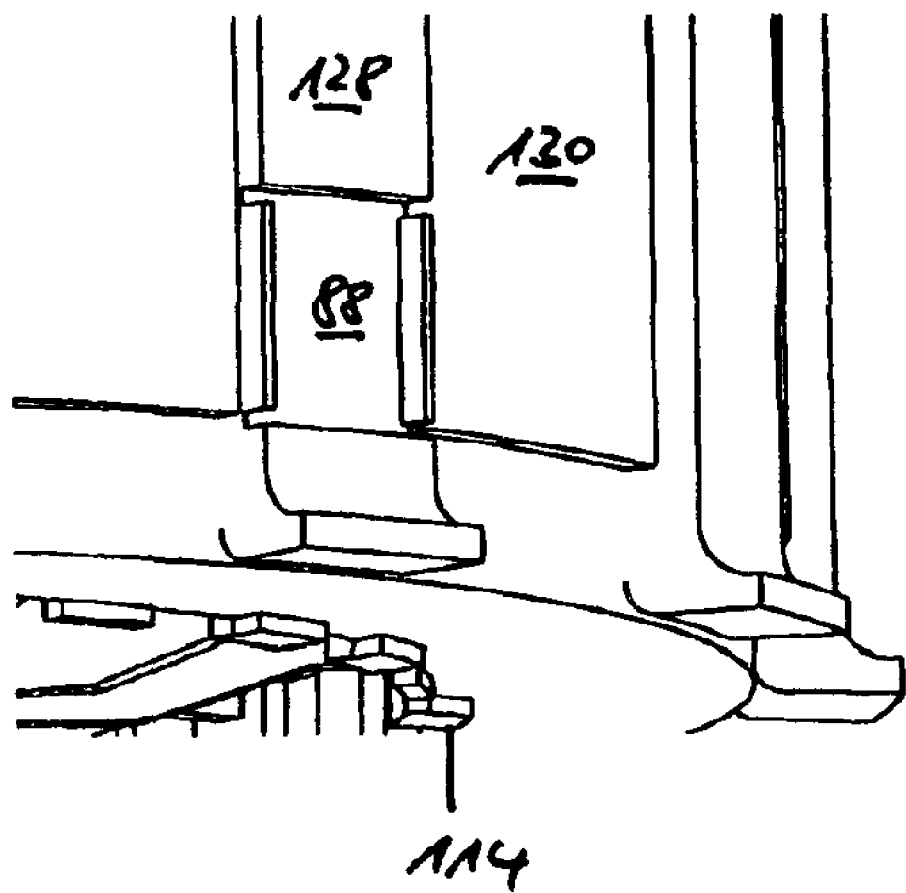
FIG. 18 shows part of a desiccant box in a perspective illustration.

FIG. 18 shows part of a desiccant box 56 in the perspective illustration. Here, the recesses 88 and also the holders 124 can likewise be seen. Moreover, regions 128 can be seen which have an enlarged diameter with respect to adjacent regions 130. With the desiccant box 56 inserted into the housing 64 of the air drier cartridge 14, the regions 128 bear against the housing 64. The regions 130 then serve as ducts in order to conduct the compressed air upward when it flows into the air drier cartridge 14.

Figure 19:
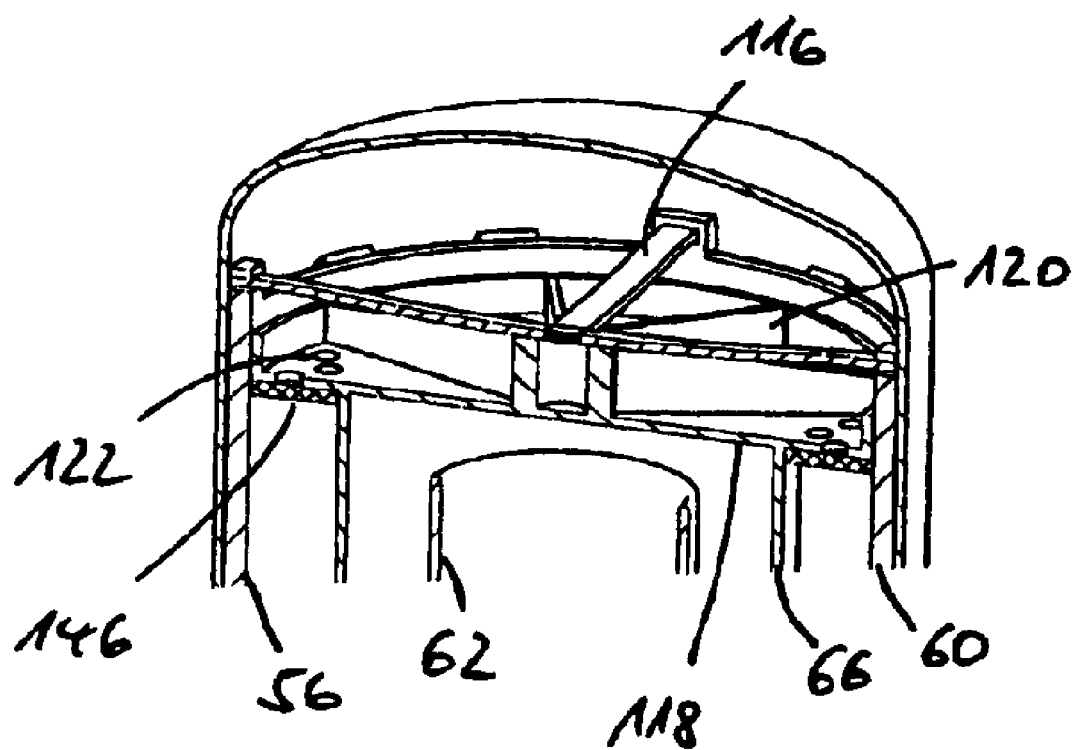
FIG. 19 shows a perspective sectional illustration of part of an air drier cartridge according to the invention.

FIG. 19 shows a perspective sectional illustration of part of an air drier cartridge. A spring device 116 is fastened to the desiccant box 56, the connection preferably being made by injection molding. The spring device 116 consists of two resilient elements which intersect one another and are connected to one another in the center of the arrangement. They act there upon a compression device 118 with a downward force, in order thereby to drive this force into the desiccant box 56. Alternatively, a, for example, centrally arranged helical spring could be provided which is supported on the housing 64 of the air drier cartridge 14. The compression device 118 is stabilized by a plurality of webs 120, and it has through holes 122 which allow an overflow of the air present above the compression device 118 into the duct between the outer tubular piece 60, which is an integral part of the desiccant box 56, and the tubular piece 66 which is connected to the compression device 118. Arranged in this duct, on the inlet side, is a filter 146, through which the air flows when it enters the duct.

Figure 20:
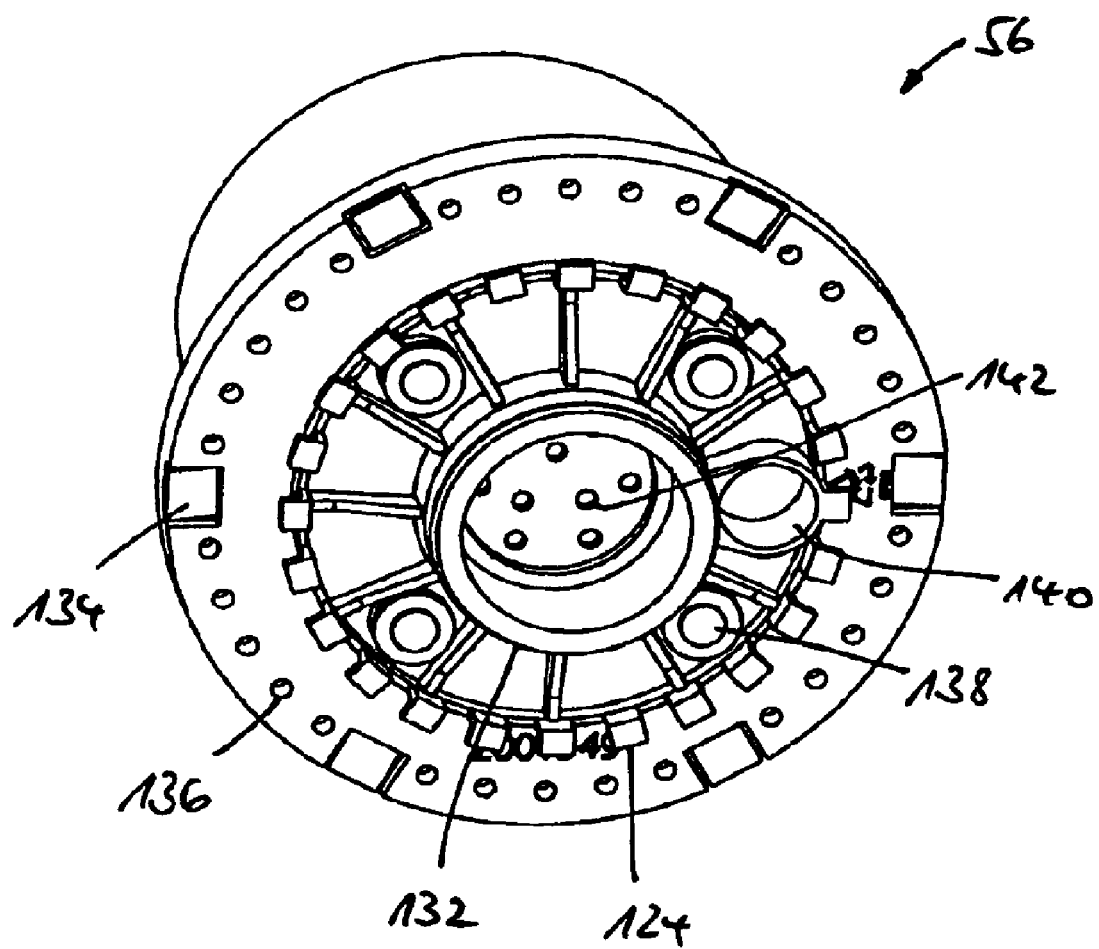
FIG. 20 shows a desiccant box in a perspective illustration.

FIG. 20 shows a desiccant box 56 in a perspective illustration. This desiccant box 56 may be used, for example, in the embodiment of the compressed-air supply device 10 which was described in connection with FIGS. 4 and 5. The spring 58, illustrated in FIG. 4, can penetrate into the central orifice 132 of the desiccant box 56, in order to act with force upon the desiccant box 56 in the direction of the air drier cartridge 14. On the circumference of the desiccant box 56, a plurality of spring tabs 134 are arranged, which hook into the housing 64 of the air drier cartridge 14 and thus likewise exert an axially upwardly directed force on the desiccant box 56. If the spring tabs 134 are suitably designed, the spring 58 penetrating into the orifice 132 may sometimes be dispensed with, thus making it easier to assemble the compressed-air supply device 10. In the region of the circumference of the desiccant box 56, a multiplicity of orifices 136 are provided, via which the compressed air flows into the desiccant. Inside the orifice 132, a plurality of orifices 142 can be seen, through which compressed air can flow out of the desiccant box 56. Furthermore, holders 124 for holding the prefilter 70 can be seen. Arranged further inward are nonreturn valves 138, via which the desiccant box can be scavenged. The nonreturn valves lie directly below the desiccant-filled region, preferably a filter fleece 68 shielding the nonreturn valves 138 from the desiccant. The desiccant box 56 has, furthermore, an orifice 140. When the air drier cartridge 14 is being placed onto the valve housing 12, a tenon connected to the valve housing penetrates into this orifice 140. This tenon serves for precentering the air drier cartridge 14 in relation to the valve housing 12 and for securing the components against rotation with respect to one another. The tenon on the valve housing preferably has a length such that said tenon makes available the first contact between the valve housing 12 and the air drier cartridge 14 during the mounting of the latter.

TABLE OF REFERENCE SYMBOLS

10 Compressed-air supply device
12 Valve housing
14 Air drier cartridge

16 Bayonet fastening
18 Collar
20 Collar portion
22 Base
24 Outer bayonet ring
28 Recess
30 Seal
32 Inner bayonet ring
34 Collar
36 Projection
38 Recess
40 Foot flange
42 Securing element
44 Orifice
46 Orifice
48 Nose
50 Spring
52 Inlet
54 Outlet
56 Desiccant box
58 Spring
60 Outer tubular piece
62 Inner tubular piece
64 Housing
66 Tubular piece
68 Filter fleece
70 Prefilter
72 Duct
74 Duct
76 Seal
78 Collar
80 Projection
82 Seal
84 Securing element holder
86 Corrugated surface
88 Recess
90 Latching nose
92 Projection
94 Surface
96 Run-on slope
98 Extension
100 Bore
102 Cover
104 Knurled margin
106 Tab
108 Orifice
110 Radial seal
112 Desiccant region
114 Groove
116 Spring device
118 Compression device
120 Web
122 Through hole
124 Holder
128 Region
130 Region
132 Orifice
134 Spring tab
136 Orifice
138 Nonreturn valve
140 Orifice
142 Orifice
144 Seal
146 Filter
210 Electrically activatable valve
212 Pneumatically activatable valve
214 Electronic control unit
216 Nonreturn valve
218 Pressure sensor
220 Compressed-air tank
222 Electrically activatable discharge valve
224 Compressor
226 Control inlet
228 First connection
230 Second connection
232 Deaeration
234 Control inlet
236 Further connection
238 Further connection
240 Valve disk
242 Spring
244 Control piston
246 Valve disk
248 Spring
250 Piston
252 Valve housing
254 Seal
256 Seal
258 Seal
260 Spring
262 Backspace The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressed-air supply device for a vehicle, comprising:
    a valve housing;
    an air drier cartridge, the air drier cartridge being supplyable via the valve housing with compressed air which flows through the air drier cartridge in a first flow direction;
    an electrically activatable valve arranged in the valve housing, the electrically activatable valve being operatively configured to induce a back flow of the compressed air through the air drier cartridge opposite to the first flow direction to regenerate the air drier cartridge; and
    a second valve activatable pneumatically by the electrically activatable valve, the air drier cartridge being supplyable with compressed air for regeneration via the second valve.

2. The compressed-air supply device according to claim 1, wherein the electrically activatable valve is a 3/2-way valve.

3. The compressed-air supply device according to claim 1, wherein the second valve that is pneumatically activatable is a 2/2-way valve.

4. The compressed-air supply device according to claim 2, wherein the second valve that is pneumatically activatable is a 2/2-way valve.

5. The compressed-air supply device according to claim 1, further comprising:
    a desiccant box filled with desiccant, the desiccant box being arranged in a housing of the air drier cartridge; and
    an elastic device by which the desiccant is compressed.

6. The compressed-air supply device according to claim 3, further comprising:
    a desiccant box filled with desiccant, the desiccant box being arranged in a housing of the air drier cartridge; and
    an elastic device by which the desiccant is compressed.

7. The compressed-air supply device according to claim 5, wherein the desiccant box comprises a base, on which are arranged an outer tubular piece and an inner tubular piece, said tubular pieces being open on their side facing away from the base;
 a further tubular piece arranged between the outer tubular piece and the inner tubular piece, the further tubular piece being open on its side facing the base; and
 wherein the further tubular piece is displaceable in an axial direction in relation to the desiccant box via the elastic device.

8. The compressed-air supply device according to claim 6, wherein the desiccant box comprises a base, on which are arranged an outer tubular piece and an inner tubular piece, said tubular pieces being open on their side facing away from the base;
 a further tubular piece arranged between the outer tubular piece and the inner tubular piece, the further tubular piece being open on its side facing the base; and
 wherein the further tubular piece is displaceable in an axial direction in relation to the desiccant box via the elastic device.

9. The compressed-air supply device according to claim 7, wherein the housing of the air drier cartridge, the outer tubular piece, the further tubular piece, and the inner tubular piece form a labyrinth structure through which compressed air to be dried is flowable with a three-fold reversal of the flow direction.

10. The compressed-air supply device according to claim 8, wherein the housing of the air drier cartridge, the outer tubular piece, the further tubular piece, and the inner tubular piece form a labyrinth structure through which compressed air to be dried is flowable with a three-fold reversal of the flow direction.

11. The compressed-air supply device according to claim 5, further comprising a radial seal for radially sealing the desiccant box with respect to the valve housing.

12. The compressed-air supply device according to claim 7, further comprising a radial seal for radially sealing the desiccant box with respect to the valve housing.

13. The compressed-air supply device according to claim 9, further comprising a radial seal for radially sealing the desiccant box with respect to the valve housing.

14. The compressed-air supply device according to claim 5, further comprising a radial seal by which the desiccant box cooperates with a foot flange of the air drier cartridge.

15. The compressed-air supply device according to claim 7, further comprising a radial seal by which the desiccant box cooperates with a foot flange of the air drier cartridge.

16. The compressed-air supply device according to claim 9, further comprising a radial seal by which the desiccant box cooperates with a foot flange of the air drier cartridge.

* * * * *